UNITED STATES PATENT OFFICE.

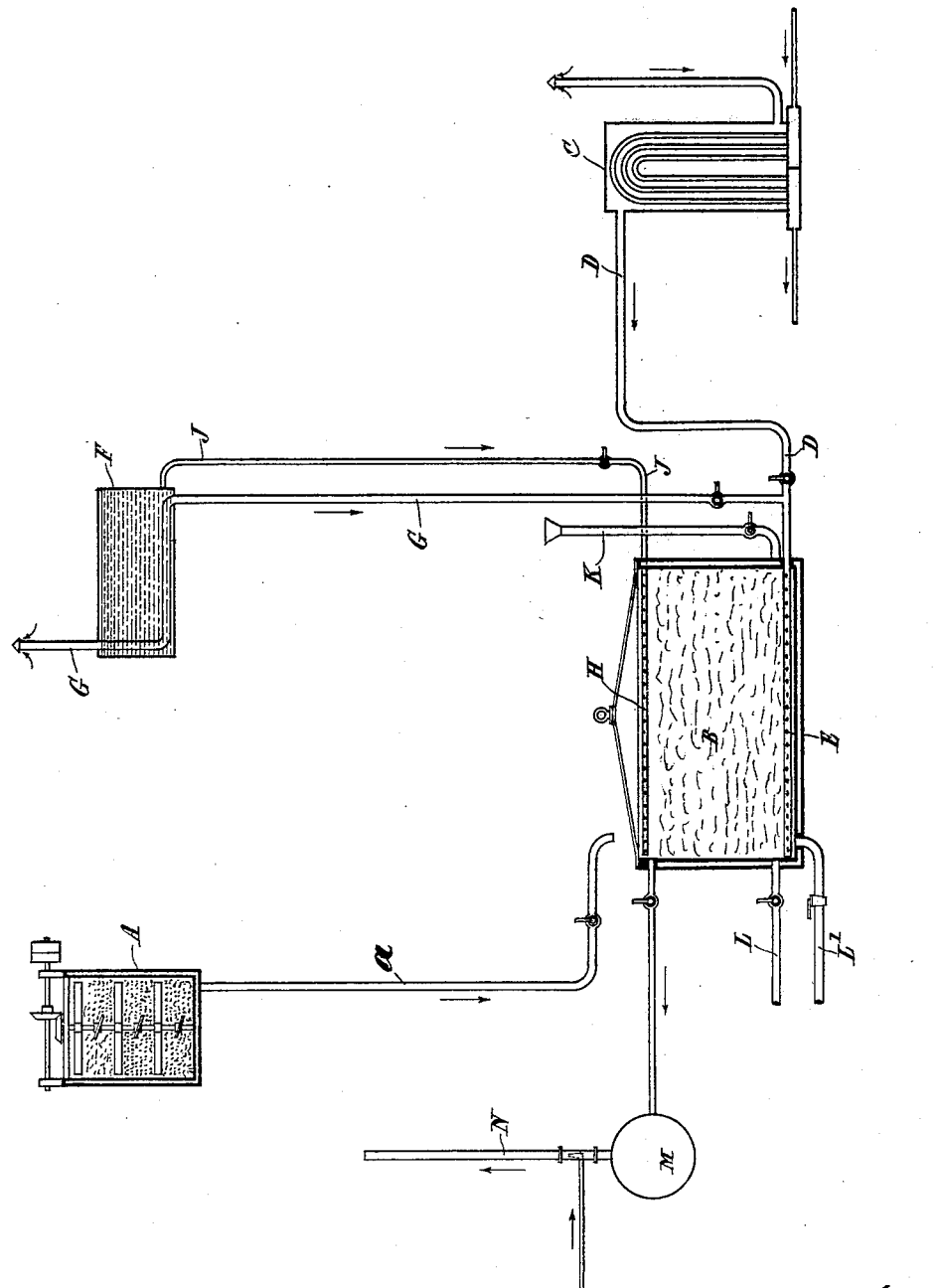

JOHN NUGENT HARRIS, OF LONDON, ENGLAND, ASSIGNOR TO THE GLOBE TRADING COMPANY, LIMITED, OF SAME PLACE.

PROCESS OF REFINING OILS OR FATS.

SPECIFICATION forming part of Letters Patent No. 623,368, dated April 18, 1899.

Application filed May 2, 1898. Serial No. 679,484. (No specimens.)

*To all whom it may concern:*

Be it known that I, JOHN NUGENT HARRIS, analytical chemist, of 21 Howard road, South Norwood, London, in the county of Surrey, England, have invented an Improved Process of Treating Edible and other Fats of all Kinds, of which the following is a specification.

This invention relates to the treatment of animal fats—such as butter, lard, tallow, suet, or any other animal fats used in commerce—for the purpose of purification whether in a natural or manufactured state; but the invention may also be employed in the bleaching of fats and in the blending or mixing of various qualities of fats to produce a material of uniform consistency and quality.

It is well known that some edible fats are liable after a time to become rancid, in which state they are useless for edible purposes, while other fats suffer other kinds of deterioration; but by this invention such fats may be treated so as to restore them to the edible or other useful state. It is also well known that in manufactured fats, such as butter and lard, there are various grades of the article, and by this invention these various grades may be combined and made of a uniform quality.

It may be here remarked that in all cases the fats will be reduced to a liquid or oily state before they can be treated and extraneous solid matters, where there are such, will be removed by straining.

In the treatment of rancid butter the butter in a liquid state, or "liquid" butter, as it may be termed, is first raised to a temperature of between 110° and 130° Fahrenheit in a suitable vessel. To one hundredweight of the liquid butter is gradually added ten gallons of a ten-per-cent. solution of chlorid of sodium in water, milk, buttermilk, or whey, the temperature being kept up at from 110° to 130° all the time. While the solution is being added, the mass is well stirred by mechanical means until a fairly-liquid emulsion is formed. In place of the solution of chlorid of sodium five gallons of a one-per-cent. solution of sulfuric acid in water, buttermilk, or whey may be used. At this stage the agitation is stopped and the emulsion is allowed to rest for about twelve hours, less or more, the temperature being maintained at not less than 100° Fahrenheit. During this time of rest the solution, which may be termed the "absorbing and neutralizing" liquid, absorbs and neutralizes much of the deleterious matters contained in the liquid butter which tend to give the rancidity. After the lapse of the requisite time the emulsion is run into another vessel containing a suitable washing liquid, preferably twenty gallons of a five-per-cent. solution of chlorid of sodium in water, milk, buttermilk, or whey, or it may be five gallons of a one-half-per-cent. solution of sulfuric acid in water, buttermilk, or whey. In this vessel (which should be capable of being hermetically closed) the emulsion is subjected to an aerating process. The temperature of this solution or other washing liquid may range between 95° and 120° Fahrenheit, not less nor more. As soon as the emulsion is poured in the cover will be closed down and a jet-exhauster or other mechanism is set to work to produce a vacuum above the emulsion. At the same time air heated to a temperature of from 120° to 140° Fahrenheit is admitted at the bottom of the vessel through a finely-perforated coil of pipe or other suitable means and passes up (under the influence of the exhauster) through the solution and the emulsion in a number of fine streams. After some time of this treatment it will be found that the emulsion has disappeared or is broken up, and from this time aeration must be continued for from forty-five to ninety minutes, according to the character of the material under treatment. The aeration has the effect of agitating the material and loosening the impurities. The volatile impurities, which chiefly give the bad odor to the butter, are carried off to the atmosphere by the suction of the steam-jet, while the solid impurities, which also become loosened by the combined operations of aeration and washing, are ready to precipitate as soon as the agitation ceases. The mass is then allowed to rest for a time, the temperature being maintained until the oily particles come to the surface of the washing liquid, by which the impurities are held back. The bulk of this liquid is then run off, taking with it most of the solid impurities, a sufficient quantity of the liquid being left in the vessel to cover the perforated pipe, by which the air enters. Another five gallons of a five-per-cent. solution of chlorid of sodium in water at the same temperature as before is next poured into the vessel and aeration again takes place for about half an hour, the temperature of the air being maintained at 110° Fahrenheit. When sulfuric acid has been used for the chemical solution, only plain water is added at this stage, the quantity being about fifteen gallons. The effect of this second aeration is to produce a second emulsion, differing entirely from the first emulsion in that it becomes a stiff glutinous substance. The temperature of the air is then gradually lowered and the emulsion hardens and breaks up, butter in the "grain" form being produced. The butter is then removed to the butter-worker and is worked in the ordinary manner.

The hardening of the butter-fat may be assisted by allowing a spray of cold water to play upon it during the latter period of aeration. The spraying with water will also assist in washing the last remnants of the impurities out of the butter.

When treating low-grade butters (which are not rancid) for the purpose of obtaining a uniform material, sulfuric acid is not used for the solution, as it is found to affect the texture of the butter, and texture is one of the points that merchants look to.

When treating lard, whether rancid or low grade, an emulsion is produced, as before described, except that in no case would whole milk be used for the solution. In the aerator the quantity of washing liquid should be increased to from forty to fifty gallons of a five-per-cent. chlorid-of-sodium solution or ten gallons of a one-half-per-cent. sulfuric-acid solution, and at the same time the temperature may be increased to 130° Fahrenheit. After aeration for a sufficient time, which must be judged by the attendant, the washing liquid, with the impurities, is run off, and the same quantities of washing liquid are added as before and aeration again takes place.

The character of lard is not to harden into the grain form, as in butter, and it is not required to produce the second emulsion. The solution is therefore run off again, and washing with pure water and aeration at about 130° Fahrenheit is kept up until all trace of chemical solution is removed, which can be tested by the use of red or blue litmus-paper, as the case may be, or in any other convenient manner. The washing-waters are run off from time to time into a suitable vessel, where they are allowed to cool, so that any fat carried off will rise to the surface to be removed. Lastly, the purified liquid fat is run from the aerator into a suitable vessel and is allowed to cool and solidify for future use.

The treatment of tallow, suet, and other fats will be the same as that for the lard.

In the accompanying drawing is shown, diagrammatically, apparatus which may be used for carrying out the invention.

Referring to the drawing, A represents a steam-jacketed emulsifier in which the emulsion is produced by any convenient mechanical means and from which the contents are discharged by a pipe $a$ into a steam-jacketed aerator B.

C is a steam-heater for heating air introduced by the pipe D to the aerator-coil E.

F is a tank to contain ice or cold water and through which the air for the aerator passes by the pipe G when cold air is to be introduced to the coil E. Cold water for the spray H in the aerator B may also be drawn from the tank F by the pipe J. The washing liquid is introduced to the aerator when necessary by the pipe K. The pipe L serves as a draw-off pipe, and L' the emptying-pipe.

M is a vacuum-chamber, with which a series of aerators may be connected, and N is an injector for producing the vacuum.

What is claimed is—

1. The process of purifying fats, consisting in forming an emulsion of the liquid fat with an absorbing and neutralizing liquid; aerating the emulsion with hot air in the presence of a washing liquid; removing the impurity-laden washing liquid; aerating again in the presence of more washing liquid at a temperature of from 95° to 120° Fahrenheit; and finally aerating and washing with pure water, as and for the purpose set forth.

2. The process of purifying fats, consisting in forming an emulsion of the liquid fat with an absorbing and neutralizing liquid containing chlorid of sodium in solution; aerating the emulsion with hot air in the presence of a washing liquid; removing the impurity-laden washing liquid; aerating again in the presence of more washing liquid at a temperature of from 95° to 120° Fahrenheit; and finally aerating and washing with pure water, as and for the purpose set forth.

3. The process of purifying fats consisting in forming an emulsion of the liquid fat with an absorbing and neutralizing liquid containing chlorid of sodium in solution; aerating the emulsion with hot air in the presence of a washing liquid containing chlorid of sodium in solution; removing the impurity-laden washing liquid; aerating again in the presence of more washing liquid at a temperature of from 95° to 120° Fahrenheit; and finally aerating and washing with pure water, as and for the purpose set forth.

4. The process of purifying fats consisting in forming an emulsion of the liquid fat with an absorbing and neutralizing liquid; aerating the emulsion with hot air in the presence of a washing liquid; removing the impurity-laden washing liquid; producing a second emulsion by aeration with hot air in the presence of more washing liquid at a temperature of from 95° to 120° Fahrenheit; and then gradually lowering the temperature of the air and at the same time washing with a spray of cold water, as and for the purpose set forth.

5. The process of purifying rancid butter consisting in heating "liquid butter" to from 110° to 130° Fahrenheit; forming an emulsion (by mechanical agitation) of "liquid butter" and a warm absorbing and neutralizing liquid at the same temperature; aerating the emulsion with hot air at a temperature of from 120° to 140° in the presence of a warm "washing liquid" at a temperature of from 95° to 120°; removing the impurity-laden liquid; producing a second emulsion by aeration with hot air at a temperature of 110° Fahrenheit in the presence of more warm "washing liquid" at a temperature of 95° to 120° Fahrenheit; and then continuing the aeration, gradually lowering the temperature of the air in the presence of a spray of cold water, to produce "grain" butter, to be subsequently "worked," all as herein described.

London, March 23, 1898.

JOHN NUGENT HARRIS.

Witnesses:
H. K. WHITE,
H. F. C. GOLTZ.